United States Patent [19]

Niwatukino

[11] 4,133,471

[45] Jan. 9, 1979

[54] METHOD FOR MAKING CLAD METAL SHEETS HAVING AT LEAST ONE CURVED MAJOR SURFACE

[75] Inventor: Tooru Niwatukino, Ogoori, Japan

[73] Assignee: Asahi Kasei Kogyo Kabushiki Kaisha, Osaka, Japan

[21] Appl. No.: 792,115

[22] Filed: Apr. 29, 1977

[30] Foreign Application Priority Data

Nov. 1, 1976 [JP] Japan .................. 51/130422

[51] Int. Cl.² ............ B23K 21/00; B23K 31/02; B23B 15/00
[52] U.S. Cl. .................... 228/107; 228/2.5; 228/141.1
[58] Field of Search .......... 228/107, 141.1, 2.5; 29/421 E

[56] References Cited

U.S. PATENT DOCUMENTS

| | | | |
|---|---|---|---|
| 3,395,444 | 8/1968 | Davis | 228/107 X |
| 3,409,975 | 11/1968 | Rolsten | 29/421 E |
| 3,474,520 | 10/1969 | Takizawa | 29/421 E X |
| 3,672,033 | 6/1972 | Richter | 228/107 |
| 3,868,761 | 3/1975 | Apalikov | 228/107 |
| 3,900,147 | 8/1975 | Apalikov | 228/107 |
| 3,987,529 | 10/1976 | Nakagawa | 228/107 X |

FOREIGN PATENT DOCUMENTS 19966 11/1966 Japan ..................... 228/107

Primary Examiner—Donald G. Kelly
Attorney, Agent, or Firm—Armstrong, Nikaido, Marmelstein & Kubovcik

[57] ABSTRACT

A base metal having at least one curved major surface is placed on a hard plate in such a way that the curved surface is in opposed relationship with the hard plate, and a cladding metal sheet is placed in opposed and spaced-apart relationship with the upper flat major surface of the base metal. The cladding metal sheet is firmly bonded to the base metal by explosive welding, and the curved surface of the cladding metal bonded becomes substantially in conformity with the curved surface of the base metal prior to the explosive welding. A clad metal sheet with a higher degree of dimensional accuracy may be provided and the bond is very strong and highly reliable. With copper base metal and composite cladding metal sheets each prepared by butt-welding foreign metal sheets which may be different in thickness, a mold for continuous casting may be produced which may substantially eliminate casting defects.

4 Claims, 8 Drawing Figures

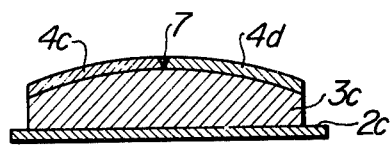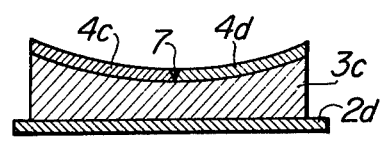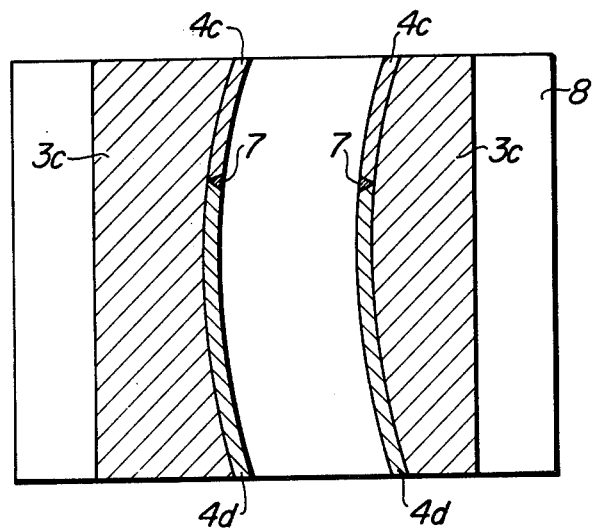

METHOD FOR MAKING CLAD METAL SHEETS HAVING AT LEAST ONE CURVED MAJOR SURFACE

BACKGROUND OF THE INVENTION

1. FIELD OF THE INVENTION

The present invention relates to a method for making clad metal sheets each having a curved facing or cladding metal layer by explosive welding and clad metal sheets produced by this method.

2. DESCRIPTION OF THE PRIOR ART

Explosive welding has been widely used for bonding foreign metals and is very effective especially when both the surfaces to be bonded are flat. Therefore explosive welding has been advantageously used in making clad metal sheets consisting of various combinations of foreign metals. In the process, the surfaces to be bonded of a base and cladding metals are cleaned to exhibit pure metallic surfaces, and the base and cladding metals are spaced apart from each other by a suitable distance when explosive-welded with an explosive whose quantity is selected depending upon the thickness of the base and cladding metals and the space therebetween.

In addition to the welding between sheets, the explosive welding has been recently used for joining between tubes and between tubes and rods. Since the bond provided by the explosive welding is very satisfactory, it is now used widely in various fields.

As the excellent properties and economical advantages of clad metals are more and more recognized in various technical fields, there arises a demand for adding a cladding metal sheet to a curved surface of a base metal. This demand is especially strong in the field of the production of molds for continous casting.

In general the main body of a mold for continuous casting is made of copper having an excellent thermal conductivity, and in order to prevent the abrasion and wear of the inner surfaces of the mold and to prevent the adhesion of copper to a billet being cast, the inner surfaces are in general coated with a foreign metal such as nickel, chromium or the like by the so-called metal plating method. In some molds, clad metal sheets made by adding a foreign metal only to the upper section by the explosive welding are used in order to protect the inner surfaces of the mold subjected to severe abrasion and wear.

However, the conventional plating methods may provide a facing or lining very thin in thickness so that the lifetime is very short. Since the molten steel is gradually solidified as it flows down in the mold, the thickness of the facing or metal lining must be gradually decreased from the upper end to the lower end, but with the present technical level it is hardly possible to solve this problem so that it is impossible in practice to change the cooling effect of a mold.

In order to solve the above and other related problems extensive studies and experiments had been conducted and now the method for making a mold with clad metal plates made by explosive welding has been widely used to increase the thickness of the metal lining, thereby increasing the lifetime of the mold. According to this method, opposed to the conventional metal plating method, the thickness of the metal lining if not limited and the metal lining in any desired thickness may be bonded to the base metal or main body of the mold. In addition, the metal lining or cladding metal sheet may be so machined as to gradually decrease the thickness from the upper end to the lower end so that the performance of the mold may be remarkably improved as compared with the molds lined with the conventional metal plating method.

In general, the conventional methods for making clad metal sheets for molds for continuous casting may be divided into two types. In one type (1) a clad metal sheet is pressed so that a cladding sheet may have a desired form and thereafter the base plate is machined flat, while in the other type (2) a base metal is machined or otherwise to have a desired surface configuration and a cladding metal sheet is bent to match with the surface of the base metal. Thereafter they are spaced apart from each other by a suitable distance and an explosive is ignited to bond them.

Either of the above methods (1) and (2) is selected depending upon the dimensions, configurations and objects of molds, but they have inherent defects to be described below.

First the method (1) has been used for welding flat sheets face-to-face so that the bond is extremely strong and highly reliable. However, the facing or cladding metal which becomes the lining surface of a mold is subjected to press forming so that the dimensional accuracy is by far inferior to that attained by the machining. As a result, an additional machining is required to attain the accuracy that a mold requires. In addition, a cladding metal sheet must have a peripheral margin equal to or twice as much as the thickness (at least more than 50 mm when the thickness is less then 50 mm) so that it may be firmly clamped in position during the pressing. As a consequence the material loss is increased. In addition, a die must be provided to form a desired curved surface for some molds.

According to the second method (2) the cladding metal is pressed to form a surface matching with that of the base metal and the base and cladding metals are spaced apart from each other by a suitable distance when they are explosive welded. However it is difficult to form the surface of the cladding metal with a high degree of accuracy so that the bond between the base and cladding metals is not reliable and separation occurs very often. In addition, the explosive welding often causes the deformation of the curved surface of the base metal so that the deformed surface must be corrected. A further serious defect of the second method (2) arises from the fact that the curved surfaces of the base and cladding metals are bonded together by the explosive welding. As a result, as compared with the cladding between the flat surface base and cladding metals the bond is not as reliable even though they are dimensioned with a higher degree of accuracy.

SUMMARY OF THE INVENTION

In view of the above, one of the objects of the present invention is to provide a method for making a clad metal sheet having a curved cladding metal layer by explosive welding and the products fabricated by this method, which may substantially eliminate the above and other defects encountered in the prior art methods.

Another object of the present invention is to provide a method for making a clad metal sheet having a curved facing by bonding, by explosive welding, a copper base plate and a foreign cladding metal with a high degree of dimensional accuracy, with a minimum loss of materials and with a highly reliable bond, and is to provide molds assembled with the clad metal sheets fabricated by this method.

Briefly stated, according to the present invention one major surface of a base metal such as copper, steel or steel alloy plate is machined to desired configurations, and thereafter the base metal is placed on a hard plate made of a hard plastic, steel or aluminum in such a way that the curved surface of the base metal is directed downwardly or in opposed relationship with the hard plate. In order to prevent the bending of the hard plate, it is in turn mounted on a flat top of a sand or earth foundation. A cladding metal is placed and spaced apart from the upper flat surface of the base metal by a suitable distance, and an explosive is placed on the upper surface of the cladding metal sheet, the quantity of the explosive being dependent upon the properties of the cladding metal sheet and the distance between the base and cladding metals. The explosive is ignited at a point corresponding to the center of the curved surface of the base metal so that the explosion proceeds toward the axis of the curved surface or the axis in symmetrical relation therewith. Upon explosion simultaneous with the bonding of the cladding metal to the base metal the latter is pressed against the hard plate so that its curved surface is flattened while the surface of cladding metal is curved to assume the same configuration of the curved surface of the base metal prior to the explosion. It is most preferably to ignite the explosive at the above described point and at one end of the cladding metal, but if an after-processing is permitted the explosion may be directed at right angles to the axis of the curved surface of the base metal or the axis symmetrical therewith. The result is the same.

The method for making clad metal sheets in accordance with the present invention may be carried out with various combinations of metal sheets which may be explosive welded, the thickness of a cladding metal sheet being 1 to 16 mm while the thickness of a base metal sheet being between 30 and 250 mm with the length of the arc of a curved surface in cross section of the base metal being less than a radius of the curve. The cladding metal sheets may have a taper between 1/750 and 15/750.

BRIEF DESCRIPTION OF THE DRAWINGS

FIGS. 4 and 5 are schematic cross sectional views of clad metal sheet fabricated with the composite cladding metal sheet shown in FIG. 3; and FIG. 6 is a longitudinal cross sectional view of a mold for use in a continuous casting process assembled with the clad metal sheets shown in FIGS. 4 and 5.

DESCRIPTION OF THE PREFERRED EMBODIMENTS

The method of the present invention for making a clad metal wherein simultaneous with explosive welding the curvature of the rear surface of a base metal is transformed to the surface of a cladding metal will be described herein in conjunction with the description of a method for fabricating a mold for continuous casting. The novel features, effects and advantages of the present invention may be best attained in the fabrication of molds for continuous casting.

In the process for making a mold for continuous casting wherein the inner surface is cladded with a different metal, the most important technical problem is how to add the cladding metal layer to the inner surface of the mold in such a way that the conditions for cooling a billet being cast may be satisfactorily met as described hereinbefore. The inventor successfully solved this problem as will be described in detail hereinafter with reference to FIGS. 1 through 6.

Figure 1A:
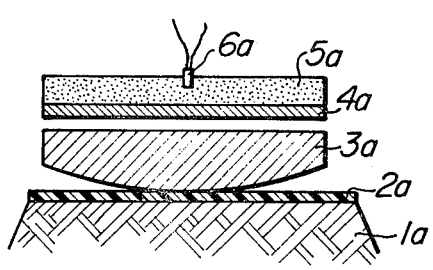
FIG. 1A is a schematic cross sectional view of a base metal with a convex-downward curved surface and a cladding metal immediately prior to the explosive welding.
Figure 2A:
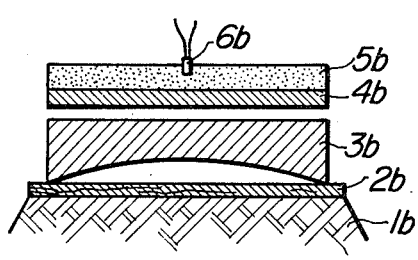
FIG. 2A is a schematic cross sectional view of a base metal with a concave-upward curved surface in cross section and a cladding metal sheet immediately prior to the explosive welding.

A composite cladding metal which is to be added to a copper plate 3c of a mold for continous casting consists of cladding metals 4c and 4d whose thermal conductivity is lower than that of the copper base metal 3c and is different from each other, the thermal conductivity of the cladding metal 4c being the lowest. These cladding metals 4c and 4d are butt-welded into the form of a sheet by any suitable welding methods such as submerged arc welding, TIG and MIG weldings, and the beads extended over the surface of the composite cladding metal sheet are removed by cutting or grinding. The thus formed composite cladding metal consisting of the cladding metals 4c and 4d is cladded to the copper base metal 3c by explosive welding as shown in FIG. 1A or 2A so that a cladded mold part may be provided as shown in FIG. 4 or 5. According to the present invention not only the composite cladding metal sheet consisting of the cladding metals 4c and 4d is welded to the copper base metal 3c but also the curvature of the rear surface of the latter is transformed to the surface of the composite cladding metal 4c and 4d simultaneous with the explosion so that the clad metal mold part per se may be used for the assembly of the mold for continuous casting.

In FIG. 6 there is shown in longitudinal cross section a mold for continuous casting fabricated in accordance with the present invention with the clad metal mold parts shown in FIGS. 4 and 5, respectively. Since the cladding metal 4c having the lowest thermal conductivity is used to prevent the overcooling of a billet being cast at the initial stage of cooling, it is preferable that the cladding metal 4c has a height or length less than 2/5 of the height of the mold. 7 and 8 designate a welding line and a side plate of the mold, respectively.

Cladding metals 4a, 4b, 4c and 4d used in the present invention may be suitably selected depending upon the dimensions, configurations, constructions and properties of a billet to be cast, but from the standpoints of thermal conductivity, fusion to the billet being cast, resistance to abrasion and wear, weldability to the base metal and mutual weldability in butt welding process, it is preferable to select the materials listed in the table below, in which the chemical compositions and thermal conductivity at 20° C of the preferred cladding metals are shown.

Table

| Cladding metals | Major chemical composition (%) | | | | | Thermal conductivity Cal/cm, sec. ° C |
|---|---|---|---|---|---|---|
| | Cu | Ni | Cr | Fe | Others | |
| Copper | 99.96 | — | — | — | 0.04 | 0.94 |
| Copper-Nickel | 87.9 | 9.8 | — | 1.5 | 0.8 | 0.11 |
| Copper-Nickel | 68.0 | 30.6 | — | 0.6 | 0.8 | 0.07 |
| Ni-cu-Alloy | 31.5 | 66.2 | — | 1.1 | 1.2 | 0.074 |
| Nickel | — | 99.98 | — | — | 0.02 | 0.22 |
| Fe-Ni-Cr Alloy | — | 8.7 | 18.9 | 70.1 | 2.3 | 0.035 |
| Fe-Cr Alloy | — | — | 13.8 | 84.4 | 1.8 | 0.058 |

In a mold for continuous casting fabricated in accordance with the present invention, all of the inner surfaces are cladded with different metals by explosive welding, and the cladding metals have different physical and chemical properties and different thermal conductivity so that desired cooling conditions may be easily attained by the selection of the types and thickness of the cladding metals. As a result, the molten steel may flow through the mold without any gap between the molten metal and the facing or the surfaces of the cladding metals and may be satisfactorily cooled and solidified so that billets with better qualities may be produced.

As compared with the prior art molds whose inner surfaces are plated by the conventional methods, the molds fabricated in accordance with the present invention have thicker facing or cladding metal layer so that the lifetime may be considerably increased. Furthermore opposed to the prior art method wherein a cladding metal is added to a copper base metal by explosive welding and then the cladded metal is suitably machined, the method in accordance with the present invention uses only one explosive welding for not only adding a cladding metal to base metal but also transforming the curved rear surface of the base metal to the surface of the cladding metal so that a required surface of the passage of a billet of a mold may be formed.

According to the present invention, the thickness of the upper and lower cladding metals 4c and 4d (See FIG. 6) may be varied as needs demand. The composite cladding metal consisting of the cladding metals different in thickness may be bonded to a base metal and the surface of the composite cladding metal may be conformed with the curved rear surface of the base metal prior to the explosive welding in the manner substantially similar to that described above. In the mold thus fabricated, the thickness of the cladding metal layer in the upper section is greater than the thickness of the cladding metal in the lower section so that desired cooling effects may be easily attained. This arrangement can substantially eliminate the problem encountered in the prior art method for controlling the thickness of the cladding metal layer by plating.

In addition, according to the present invention a composite cladding metal consisting of two different kinds of cladding metals may be used so that desired cooling effects may be more easily attained by a suitable combination of types and thickness of cladding metals.

In summary, according to the present invention the explosive welding is used not only for bonding a composite cladding metal sheet to a base metal but also for forming a desired surface of the composite cladding metal sheet with a higher degree of accuracy than is attainable by machining. In addition, the types and thickness of cladding metals which constitute a composite cladding metal sheet may be suitably selected depending upon desired cooling effects of a mold for continuous casting. Thus the novel features, effects and advantages of the present invention may be best attained when applied to the fabrication of molds for continuous casting.

Next some examples of the present invention will be described.

EXAMPLE 1

Figure 1B:
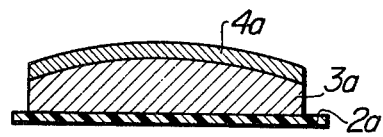
FIG. 1B is a schematic cross sectional view of a clad metal sheet after the explosive welding.

As shown in FIG. 1A the copper base metal 3a 65 mm in thickness, 750 mm in width and 2500 in length has its rear surface machined widthwise to form a partially cylindrical surface downwardly directed, the radius of the cylindrical surface being 10272 mm, and the copper base metal 3a was placed on a steel base 2a 32 mm in thickness which in turn was mounted on a sand or earth foundation 1a. A nickel cladding metal sheet 4a 6 mm in thickness was placed in opposed relationship with the flat surface of the copper base metal 3a, and an explosive 5a with an electric detonator 6a was placed on the upper surface of the cladding metal 4a in such a way that the explosion may proceed toward an axis in symmetrical relation with the axis of the curved surface of the copper base metal 3a. After the explosion, the cladding metal 4a was firmly welded to the copper base metal 3a and the curved surface of the cladding metal 4a had the radius substantially equal to the curved surface of the base metal 3a before the explosion as shown in FIG. 1B.

EXAMPLE 2

Figure 2B:
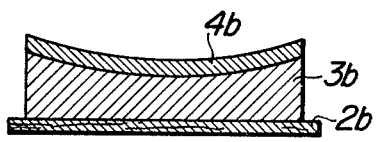
FIG. 2B is a schematic cross sectional view of a clad metal sheet after the explosive welding.

As shown in FIG. 2A the copper base metal 3b 65 mm in thickness, 750 mm in width and 2500 mm in length had its rear surface machined to form a partially spherical concave-downward surface with the radius of 10500 mm, and was placed on a plywood base 2b 10 mm in thickness which in turn was mounted on a sand or earth foundation 1b. A cladding metal AISI 410 and 6 mm in thickness was placed in opposed relationship with the flat surface of the copper base metal 3b and an explosive 5b with a detonator 6b was placed on the upper surface of the cladding metal 4b in such a way that the explosion may proceed toward the axis of the curved surface of the base metal 3b. After the explosion the cladding metal 4b was firmly joined to the base metal 3b, and the radius of the curved surface of the cladding metal 4b was substantially similar to that of the base metal 3b before explosion as shown in FIG. 2B.

EXAMPLE 3

Example 3 is substantially similar to Example 2 except that the cladding metal 4b had a taper of 3/750. That is, in FIG. 2A the thickness at the left side was 5 mm while the thickness at the right side, 8 mm. After the explosion the cladding metal 4b was firmly bonded to the base metal 3b as shown in FIG. 2B, but the taper of the cladding metal 4b remained substantially unchanged 3/750.

EXAMPLE 4

Figure 3:
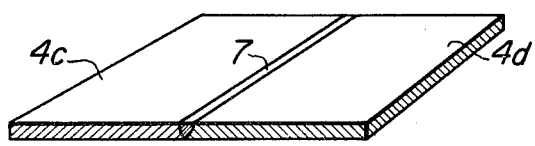
FIG. 3 is a perspective view of a composite cladding metal sheet consisting of metal sheets of two different kinds butt-cladded.

In FIG. 3 there is shown a composite cladding metal consisting of a first cladding metal 4c and a second cladding metal 4d. The first cladding metal 4c was 6 mm in thickness, 350 mm in width and 250 mm in length and was made of nickel, while the second cladding metal 4d was made of a copper-nickel alloy and was 6 mm in thickness, 400 mm in width and 2500 mm in length. The first and second cladding plates 4c and 4d were butt-welded by the conventional TIG welding along a welding line 7, and thus formed composite cladding plate had the width 750 mm (= 350 mm + 400 mm). Following the procedures of Examples 1 and 2 the composite metals were welded to the base metals 3c as shown in FIGS. 4 and 5. The bonding of the cladding metals to the base metals were very satisfactory.

What is claimed is:

1. A method for making a clad metal sheet comprising explosively deforming a base metal having a first flat surface and a second surface of predetermined curvature against a flat hard plate such that the second surface is made flat and the first surface takes on said predetermined curvature while simultaneously cladding the first surface with a cladding metal sheet by such explosion.

2. The method of claim 1 wherein the thickness of said cladding metal sheet gradually decreases along its width.

3. The method of claim 1 wherein said cladding metal sheet comprises at least two different cladding metal sheets joined together in end to end relationship by means of butt welding and wherein said cladding metal sheets are selected from the group consisting of copper-nickel alloy, nickel, nickel-copper alloy, nickel-iron-chromium alloy and iron-chromium alloy sheets.

4. The method of claim 3 wherein said base metal is a copper base plate.

* * * * *